US006672960B1

(12) United States Patent
B-Jensen

(10) Patent No.: US 6,672,960 B1
(45) Date of Patent: Jan. 6, 2004

(54) GAMING DEVICE HAVING A SYMBOL COVERING FEATURE

(75) Inventor: Janna B-Jensen, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/684,275

(22) Filed: Oct. 6, 2000

(51) Int. Cl.[7] .............................................. G06F 17/00
(52) U.S. Cl. ............................ 463/20; 463/31; 463/16
(58) Field of Search ......................... 273/143 R, 142 R; 463/20

(56) References Cited

U.S. PATENT DOCUMENTS

| | | | | | |
|---|---|---|---|---|---|
| 2,969,610 A | * | 1/1961 | Weiner | 273/143 R |
| 3,420,525 A | * | 1/1969 | Waders | 273/143 R |
| 3,642,287 A | * | 2/1972 | Lally et al. | 273/143 R |
| 3,735,987 A | * | 5/1973 | Ohki | 273/143 R |
| 4,695,053 A | | 9/1987 | Vazquez, Jr. et al. | |
| 5,152,529 A | | 10/1992 | Okada | 273/143 R |
| 5,364,100 A | | 11/1994 | Ludlow et al. | 273/143 R |
| 5,449,173 A | | 9/1995 | Thomas et al. | |
| 5,833,536 A | | 11/1998 | Davids et al. | |
| 5,997,400 A | | 12/1999 | Seelig et al. | |
| 5,997,401 A | | 12/1999 | Crawford | |
| 6,033,307 A | | 3/2000 | Vancura | |
| 6,056,642 A | | 5/2000 | Bennett | |
| 6,059,289 A | | 5/2000 | Vancura | |
| 6,086,066 A | | 7/2000 | Takeuchi et al. | 273/143 R |
| 6,089,976 A | | 7/2000 | Schneider et al. | |
| 6,117,009 A | * | 9/2000 | Yoseloff | 463/20 |
| 6,126,542 A | * | 10/2000 | Fier | 463/16 |
| 6,142,874 A | | 11/2000 | Kodachi | |
| 6,159,097 A | * | 12/2000 | Gura | 463/20 |
| 6,174,235 B1 | * | 1/2001 | Walker et al. | 463/25 |
| 6,179,711 B1 | * | 1/2001 | Yoseloff | 463/25 |
| 6,254,481 B1 | * | 7/2001 | Jaffe | 463/20 |
| 6,261,177 B1 | * | 7/2001 | Bennett | 463/16 |
| 6,270,411 B1 | * | 8/2001 | Gura et al. | 463/20 |
| 6,302,790 B1 | * | 10/2001 | Brossard | 463/20 |
| 6,309,299 B1 | * | 10/2001 | Weiss | 463/20 |
| 6,312,334 B1 | * | 11/2001 | Yoseloff | 463/25 |
| 6,375,570 B1 | * | 4/2002 | Poole | 463/31 |

FOREIGN PATENT DOCUMENTS

WO WO 9732285 9/1997

OTHER PUBLICATIONS

Marshall Fey, Slot Machines a pictorial History of the First 100 Years, 1983, Liberty Belle Books, pp. 79, 150, 171, 231.*
Description of Expanding Symbol published by IGT.
Example Lottery Scratch Card Games published by Illinois Lottery.

* cited by examiner

*Primary Examiner*—Jessica Harrison
*Assistant Examiner*—Corbett B Coburn
(74) *Attorney, Agent, or Firm*—Bell, Boyd & Lloyd LLC

(57) ABSTRACT

The present invention relates to a gaming device and method including a covering feature. The gaming device and method includes a game using a plurality of video or virtual reels, or cards, or numbers. The device rearranges the reels, cards, or numbers, randomizing, alternating or rearranging the symbols, images, or numbers thereon, then displays the newly randomized or rearranged symbols, images, or numbers. Preferably, before the newly randomized or rearranged symbols are displayed, the gaming device obscures the reels, or cards, or numbers using a cover and provides certain movements including an exhibition, preferably related to the theme of the game. The cover is used to obscure the random event, while the exhibition entertains the player.

63 Claims, 8 Drawing Sheets

GAMING DEVICE HAVING A SYMBOL COVERING FEATURE

CROSS-REFERENCE TO RELATED APPLICATIONS

This application is related to the following commonly-owned co-pending patent applications: "GAMING DEVICE WITH MULTI-PURPOSE REELS," Ser. No. 09/606,733, "GAMING DEVICE WITH MOVING SCREEN SIMULATION," Ser. No. 09/625,884, "GAMING DEVICE WITH SIGNIFIED REEL SYMBOLS," Ser. No. 09/605,344, "GAMING DEVICE HAVING COMPETITION BONUS SCHEME," Ser. No. 09/628,144, "GAMING DEVICE HAVING TOUCH ACTIVATED ALTERNATING OR CHANGING SYMBOL," Ser. No. 09/602,331, "GAMING DEVICE PROVIDING TOUCH ACTIVATED SYMBOL INFORMATION," Ser. No. 09/680,349, "GAMING DEVICE HAVING A CHANGEABLE OBJECT," Ser. No. 09/680,111, "GAMING DEVICE HAVING AN AWARD EXCHANGE BONUS ROUND AND METHOD FOR REVEALING AWARD EXCHANGE POSSIBILITIES," Ser. No. 09/689,510, and "GAMING DEVICE HAVING INTERACTING SYMBOLS," Ser. No. 09/686,308.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a symbol covering feature.

BACKGROUND OF THE INVENTION

Gaming machines such as slot machines currently exist wherein a player has one or more opportunities to obtain a particular symbol, a group of symbols or combinations of symbols. If the player obtains one of the designated winning symbols or a winning combination of symbols, the game either awards the player a credit value or provides the player with a bonus. The outcome depends upon the particular symbol or symbols obtained by the player. If the player does not obtain such symbols, the game terminates.

Generating the symbols in existing gaming machines, such as traditional slot machines, includes spinning reels in a mechanical or video format. The player or the gaming device itself initiates the reel spin which randomly alternates or rearranges the symbols. The reels stop spinning, presenting the rearranged symbols to the player along one or more paylines. Various effects have been used to generate excitement regarding the spinning reels including sounds associated with the reels and altering the motion or movement of the reels.

To increase player enjoyment and excitement, it is desirable to provide players with new features for gaming devices which bring further attention to the reels of gaming devices.

SUMMARY OF THE INVENTION

The present invention provides a gaming device and method which provides video or virtual reels which are partially or fully covered while spinning. The reels are adjacent to one another and each reel displays a plurality of indicia or symbols. Functionally, each reel spins, randomizing, altering or rearranging the symbols. The reels stop spinning and display the newly randomized or rearranged symbols.

The symbols are displayed on the reels in relation to one another. Preferably, certain combinations of symbols share a theme. For example, if all of the symbols are different types of airplanes, boats and trains, the theme could be travel. If all of the symbols are different types of beach scenes, the theme could be beaches or summer.

Preferably, before the reels start to spin, after the reels begin spinning or before the reels stop spinning and the randomized or rearranged symbols are displayed, the gaming device partially or totally obscures, hides, screens or covers the reels and symbols thereon, and performs certain exhibitions, preferably related to the theme of the game. The term "exhibition" as used in this specification includes an audio, visual or audiovisual representation of a person, place or thing in motion or at rest, including video images, graphics, activities, animations, virtual representations, simulations or movement, used in construction with the cover to obscure or hide the reels while spinning. It is anticipated that the exhibition and the cover may be the same or separate inputs to the monitor or other display device. The cover is used to obscure the reels, while the exhibition entertains the player. It is anticipated that one device, generally referred to as a "screen", incorporating the functions of both the cover and the exhibition is used. The gaming device provides the cover and exhibition or screen in one screenshot or in a succession of screenshots.

In operation, a player inserts money, coins, tokens or otherwise makes a payment to the gaming device. The gaming scheme provides the player with credits which correspond to the amount of payment made. The player pushes a play button, other activator or otherwise activates the gaming scheme which causes the reels to spin. As long as the player has credits remaining, the game enables the player to repeatedly spin the reels until the gaming device terminates the player's play.

When the player pushes the play button or otherwise activates the gaming scheme, the gaming device covers, obscures or hides the reels. In one preferred embodiment, the gaming device replaces the video depiction of the reels, with a video depiction of a cover and then replaces the cover with a video depiction of an exhibition. If, for example, a gaming scheme includes race cars, the gaming device could cover the spinning reels and then display a waving checkered flag as an exhibition. If, on the other hand, the gaming device theme includes mining for gold, the gaming device could cover the spinning reels, replacing the cover with an exhibition, including dynamite and an explosion. It is anticipated that the present invention combines the cover and exhibition into one device or screen. In this embodiment, the gaming scheme replaces the reels with the video depiction of a screen (i.e., displaying just the wiper or the racecar).

It should be appreciated that the foregoing examples are merely illustrations and that the computer can use other covers and exhibitions or screens to obscure, hide, cover or otherwise replace the reels. It should also be appreciated that the gaming device can be adapted to use the cover and exhibition or screen before or after spinning the reels, or as the game begins or terminates.

Preferably, when the exhibitions are complete, the game provides the player with an outcome, such as displaying the reels with newly arranged symbols or providing the player with credits or bonus values, providing the player with the opportunity to gain credits or bonus values, deducting credits or bonus credits from the player, terminating the game or otherwise generating a game event or determining the outcome of the game. Which particular outcome occurs is predetermined or randomly determined, and preferably programmed into the gaming device controller. It should also be appreciated that the present invention could be employed in conjunction with a bonus round or scheme which includes spinning reels.

It is therefore, an object of the present invention to provide a gaming device with a symbol covering feature.

It is a further object of the present invention to provide a gaming device that uses an exhibition to cover the reels and symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
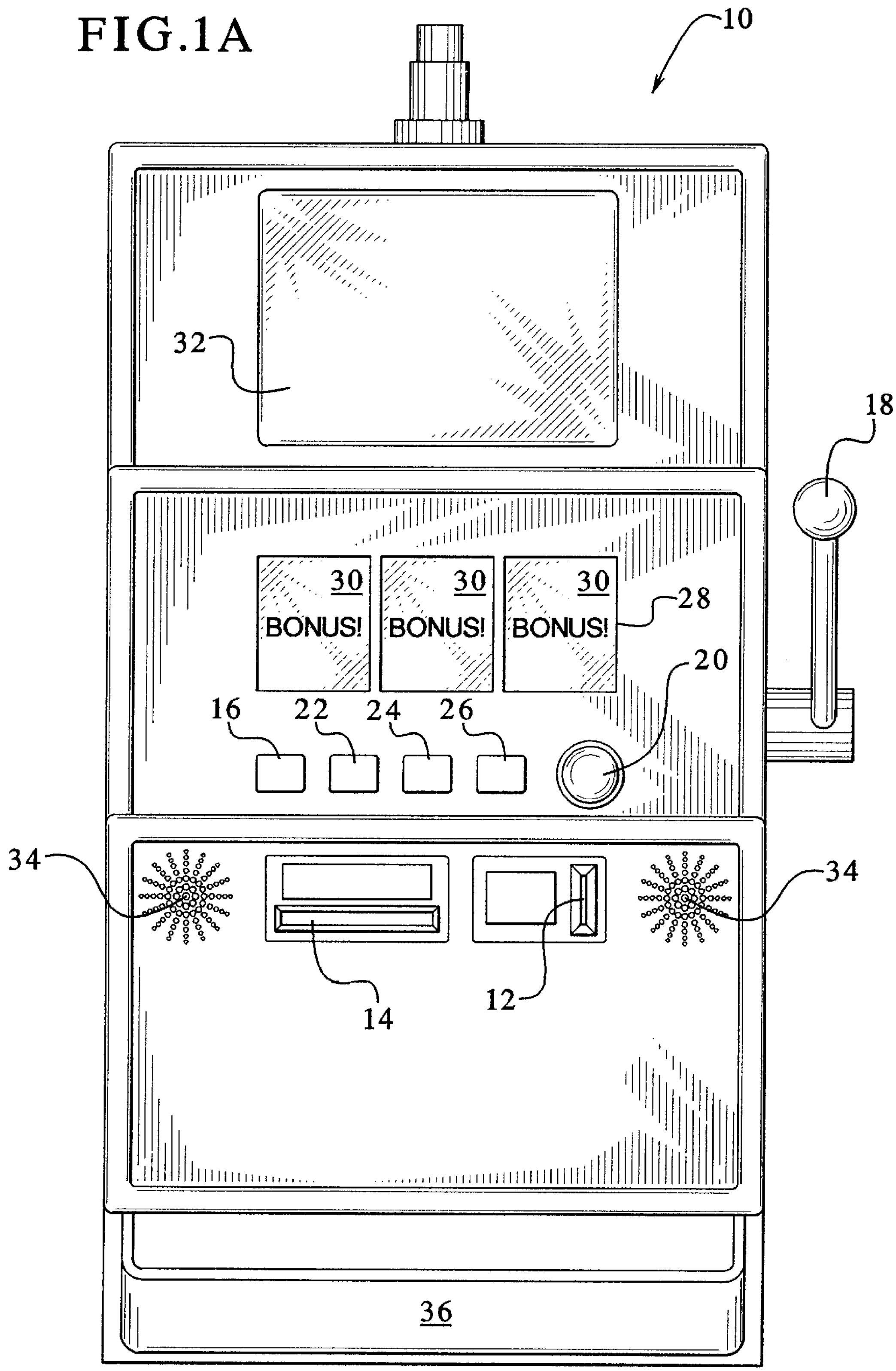
FIGS. 1A and 1B are front plan views of alternative embodiments of the gaming device of the present invention.

Referring now to the drawings, a gaming device 10 of one embodiment of the present invention, which is preferably a slot machine having the controls, displays and features of a conventional slot machine is generally illustrated. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno in addition to any of their bonus triggering events which trigger the bonus scheme of the present invention. If the present invention is employed in the primary game, the reels in the primary game are in a video form. If the present invention is employed in a bonus game, the symbols and indicia in the primary game may be in mechanical or video form.

Figure 1B:
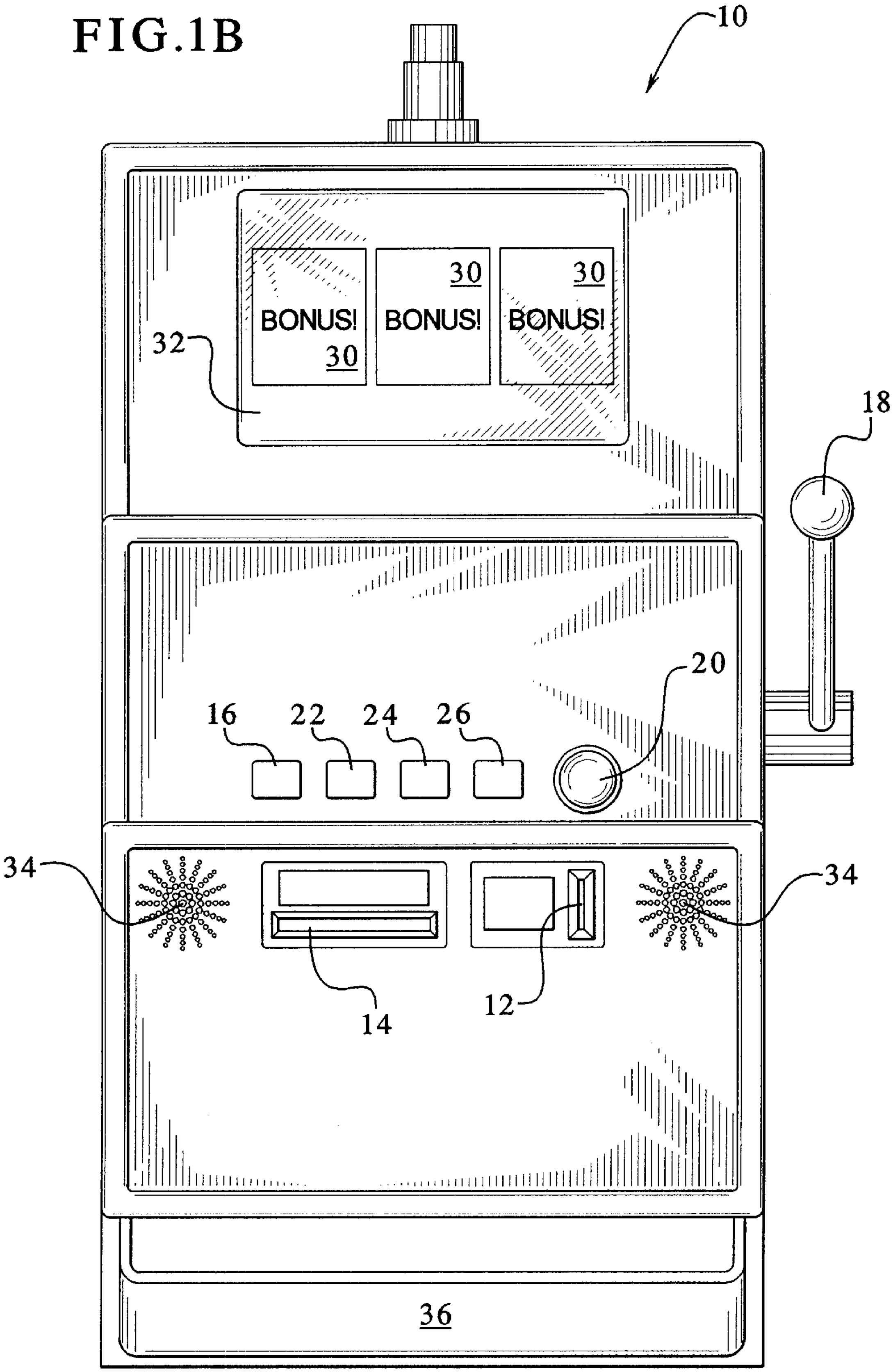

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism (including a touch screen) which starts the game.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Where the present intention is employed in the bonus game, the gaming device 10 also includes a display window 28 which contains a plurality of reels 30, preferably three to five reels in mechanical or video (i.e., virtual) form. Each reel 30 displays a plurality of indicia such as bells, hearts, fruits, numbers, letters, bars or other images which preferably correspond to a theme associated with the primary game of gaming device 10.

It should be appreciated that the display window 28 containing reels 30 and display 32 could be combined into one display so that the display 32 provides the reels 30 in video form for both the primary and secondary games along with the images, symbols and other indicia of the gaming device 10 as illustrated in FIG. 1B. Each symbol (whether in mechanical or video form) may be associated with an audio representation provided through speakers 34.

The display 32 is selected from the group consisting of cathode ray tubes "CRTs", high resolution flat panel LCDs, projection type LCDs, plasma displays, field emission displays, digital micromirror displays, LCD touchscreens, flat TV displays or other suitable displays. The display 32 is capable of portraying or displaying images, symbols and other indicia including images of people, characters, places, things and card faces associated with the game. This display 32 generally attracts patrons to play the game.

In one preferred embodiment, the display 32 is an LCD which is used to display images, symbols and other indicia which represent a primary game. It should be appreciated that while the present invention is discussed with respect to a primary game, it is equally applicable to a bonus game (i.e., a secondary game for which a bonus is awarded to the primary game). Furthermore, a plurality of smaller displays could combine to form display 32 and be used with the present invention.

At any time during the primary game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
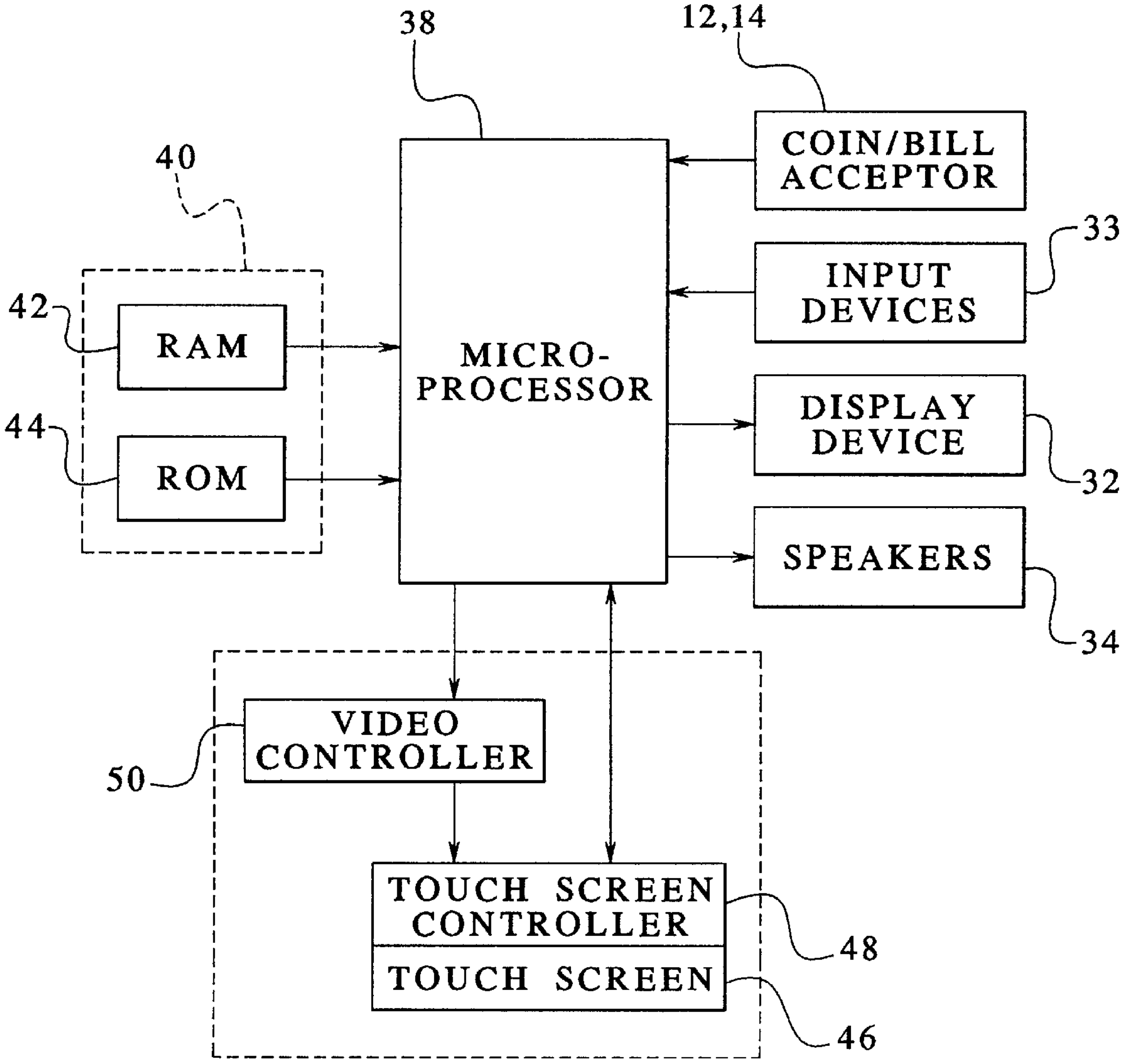
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 38, a memory device 40 for storing program code or other data, a display 32 or other display device (i.e., a liquid crystal display) and at least one input device such as play buttons 20. The processor 38 is preferably a microprocessor or microcontroller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game (either the primary or the secondary game) in accordance with applicable rules of the gaming scheme and the pay tables.

As illustrated in FIG. 2, the player preferably uses input devices 33 (comprising play buttons 20 or arm 18) to input signals into gaming device 10. It is anticipated that display 32 could include or comprise touch screen 46 with an associated touch screen controller 48. Touch screen 46 and touch screen controller 48 are connected to a video controller 50 and processor 38 for at least inputting signals into gaming device 10. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "controller."

Covering Feature

Figure 4A:
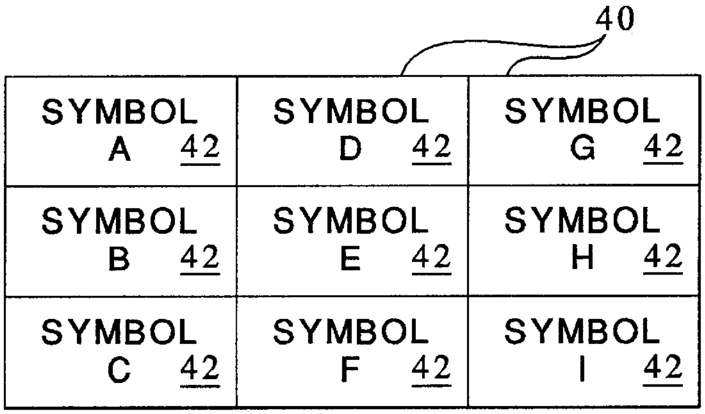
FIGS. 4A, 4B, 4C and 4D are top plan views of one embodiment of the present invention.
Figure 4B:
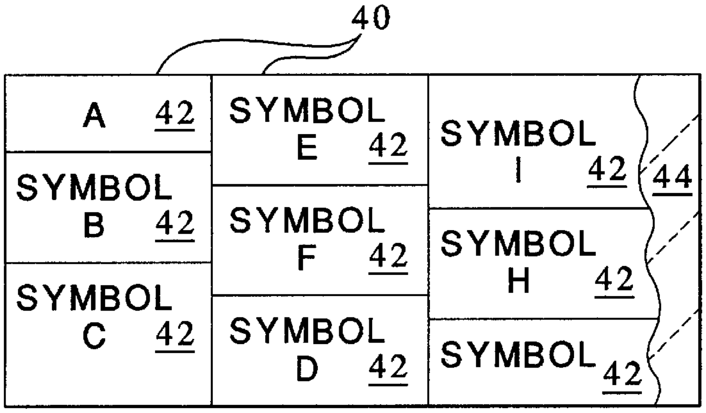
Figure 4C:
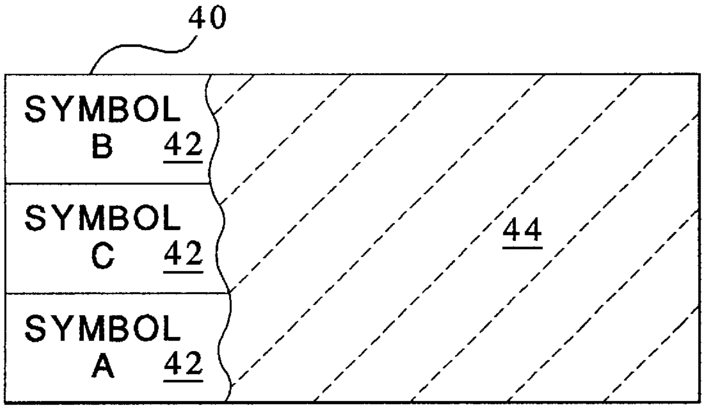
Figure 4D:
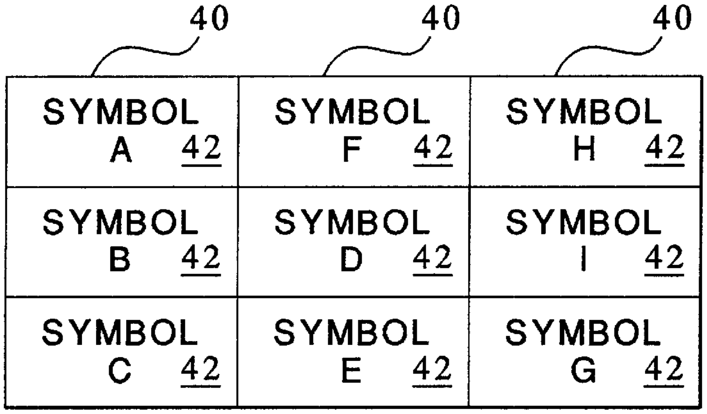
Figure 5:
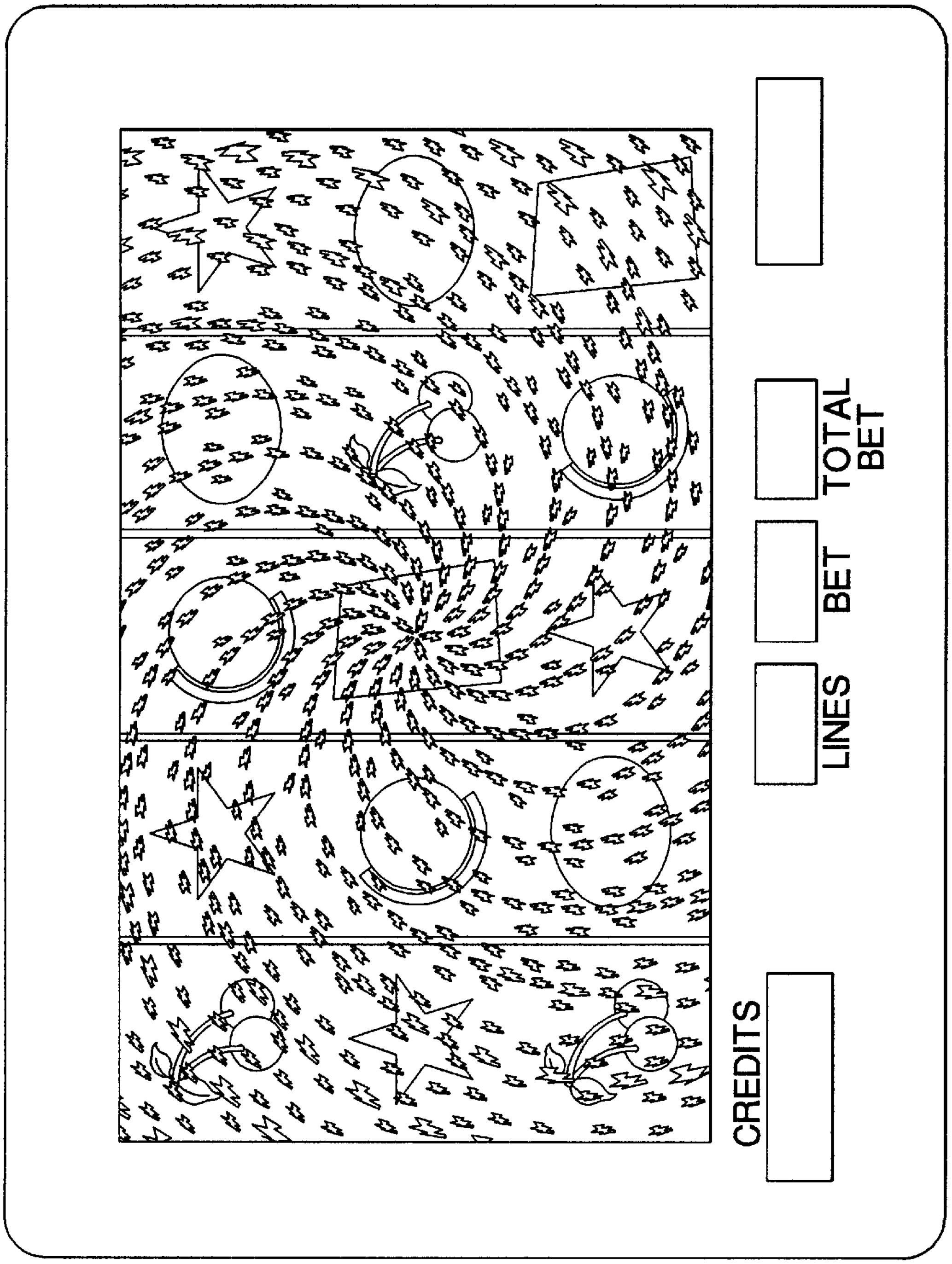
FIG. 5 is a top plan view of another embodiment of the present invention.

Display 32 provides a plurality of reels 40, preferably three to five reels in video (i.e., virtual) form, as illustrated in FIGS. 4 through 6. Each reel 40 displays a plurality of symbols 42 such as bells, hearts, fruits, characters, numbers, letters, bars or other images which preferably correspond to a theme associated with the gaming device 10. Display 32 provides only a small number of symbols 42 relatively to the total number of symbols 42 on each reel 40. When the reels 40 are at rest, they provide various combinations of symbols 42 as illustrated in FIGS. 4A and 4B.

The controller and display 32 also provide the player with one or more covers and exhibitions or screens obscuring reels 40, before the reels begin to spin, after at least one or more reels begins to spin or immediately prior to providing the rearranged or randomized symbols on the reels. Preferably, one or more reels 40 is covered, concealed or otherwise obscured by the cover 44 and exhibition or screen while the reels 42 spin. It is anticipated that the one or more reels are at least partially if not totally obscured. It is further anticipated that the gaming device 10 can screen or cover the reels 40 at anytime before, during or after the gaming device 10 spins the reels 44.

Figure 3:
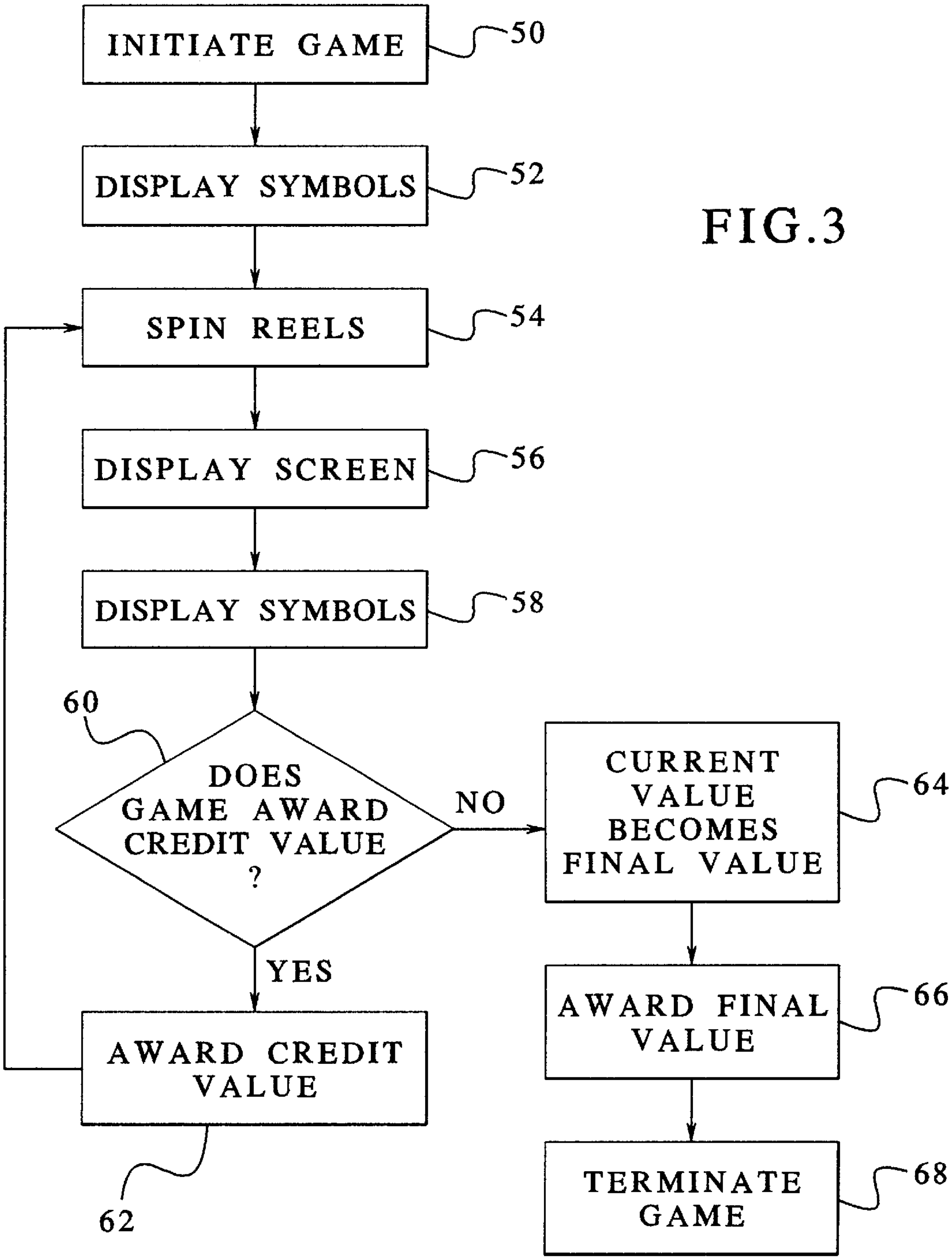
FIG. 3 is a flow diagram of one embodiment of the present invention.

In operation, the player initiates the game by inserting a payment into the gaming device 10 and selecting the player's bet options as indicated by block 50 of FIG. 3. Gaming device 10 displays the plurality of reels 40 and symbols 42 as indicated by block 52. Pushing the play button 20 spins the reels, as indicated by block 54. The gaming device 10 displays the cover and exhibition or screen as indicated by block 56 which obscures, covers, hides or screens the spinning reels 40. When the reels stop spinning, the gaming device 10 displays the symbols 42 in their newly randomized or rearranged position as indicated by block 58. The newly randomized or rearranged position of the symbols is preferably determined in accordance with a predetermined program of the gaming scheme.

The gaming device 10 determines if the player has won the game in accordance with the rules of the gaming scheme. In other words, the gaming device 10 determines whether the player receives a credit value in accordance with the gaming scheme as indicated by diamond 60 of FIG. 3. If the player wins, the gaming device 10 awards the credit value to the player as indicated by block 62. This credit value is added to the player's current value. If the player does not cash out and has credits remaining, the game enables the player to make additional spins as indicated by block 54, and the above process is repeated.

If the player does not win, the gaming device 10 does not award the player any credit value, and preferably the gaming device 10 terminates the game. It is anticipated that, even though the player does not win, if the player has remaining credits and if the player does not cash out, the game enables the player to make additional spins. In one embodiment, the player's current value becomes the final value as indicated by block 64. The game awards the player with the final value as a payout corresponding to the remaining credits, and then the game terminates as indicated by block 66 and block 68 respectively.

The game scheme of the present invention enables the display 32, and specifically the reels 40, to be used for more than one purpose. The first purpose is the traditional role of slot machine reels, which is to display a combination of symbols on the gaming device which determines whether or not a player has gained credits, lost credits, been given the opportunity to gain additional credits, or been eliminated from the game. The second purpose of the reels is to perform exhibitions for the player to emphasize events in the game and to entertain the player. These exhibitions include audio, visual, or audiovisual representations or animations.

In one embodiment of the present invention, gaming device 10 preferably includes three reels 40 shown in FIGS. 4A through 4D. When not in motion, each reel 40 displays three symbols 42 (i.e., a three by three grid).

Once the game begins, the gaming device 10 spins reels 40 as illustrated by FIG. 4B randomizing or rearranging the position of its symbols 42. The gaming device 10 displays the cover 44 as indicated by FIG. 4C. Cover 44 obscures, covers, hides or screens the spinning reels 40 from the players, heightening the player's anticipation of the final outcome of the game.

It is anticipated that the gaming device 10 only uses one screen to display cover 44. That is the display 32 replaces the video depiction of the reels 40 with a video depiction of the cover 44. It is also anticipated that the gaming device 10 uses a plurality of screens, emulating movement, to depict the cover 44 so that the cover appears to move across display 32, providing the exhibition. Preferably the cover 40 and/or exhibition obscures, covers, hides or screens all the reels 40. However, it is anticipated that only one or more reels 40 (i.e., less than all the reels 40) may be obscured at a time.

The gaming device 10 stops providing the video depiction of the cover 40, replacing the video depiction of the cover 44 and exhibition with the video depiction of the reels 40 as illustrated in FIG. 4D. Preferably, the gaming device 10 stops displaying the cover 44 after one or more of the reels 40 stop spinning. It is anticipated that display 32 stops displaying cover 44 immediately prior to stopping one or more of the spinning reels 40.

One embodiment of the present invention includes display 32 providing a plurality of reels 60 (similar to reels 30 and 40) having a plurality of symbols 62 is illustrated in FIG. 5. In this embodiment, symbols 62 includes signs, stars, globes, etc. The gaming scheme includes cover 64 that obscures symbols 62, however reels 60 are still partially visible. It is anticipated that this embodiment includes movement, providing exhibition 66 including a swirling motion similar to a dream sequence which obscures or covers the symbols 62. It is further anticipated that the swirling motion is larger or heavier in appearance than illustrated in FIG. 5 so that the symbols 62 are totally obscured and reels 60 are not visible at all.

Figure 6A:
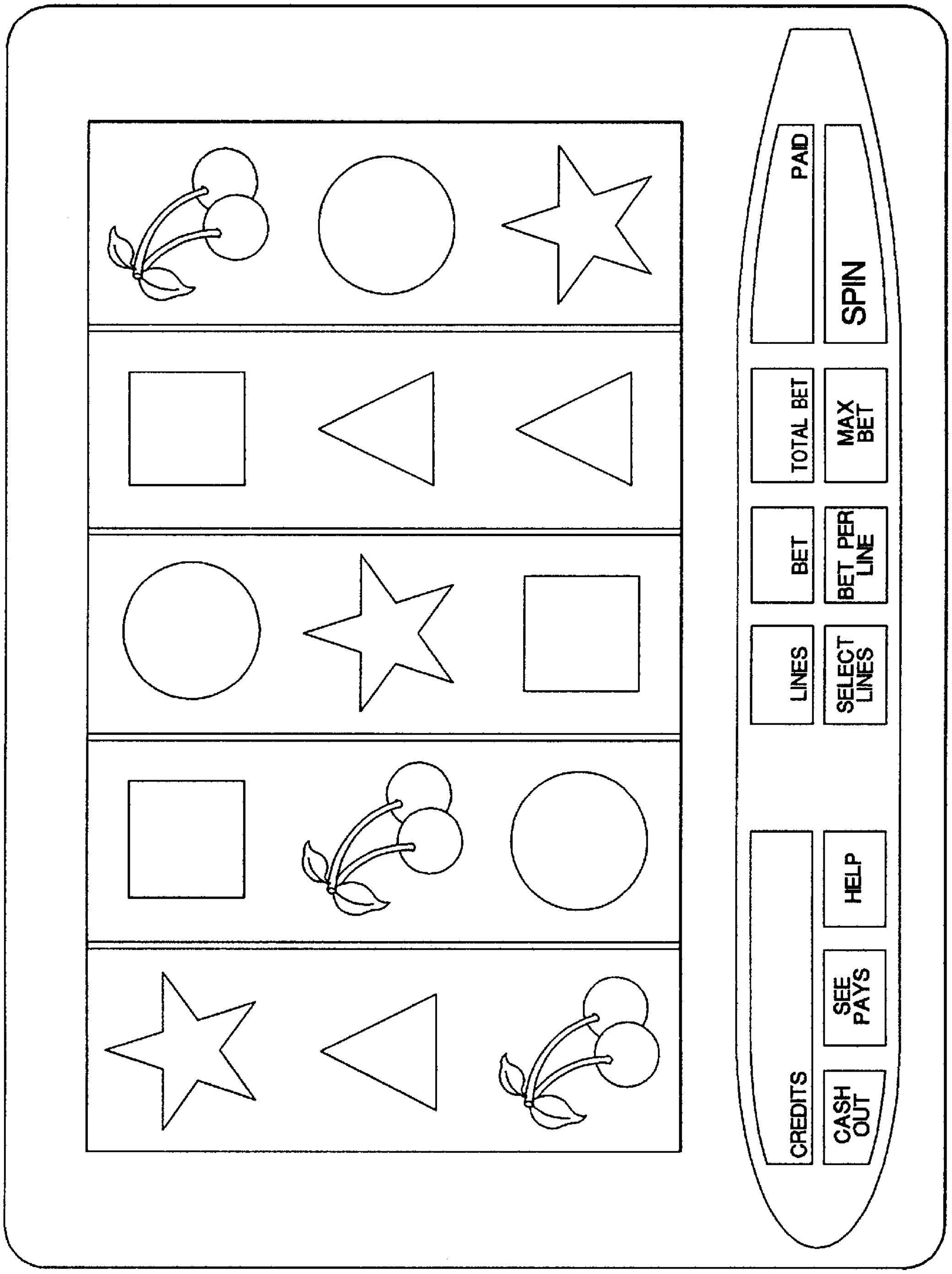
FIGS. 6A and 6B are top plan views of another embodiment of the present invention.
Figure 6B:
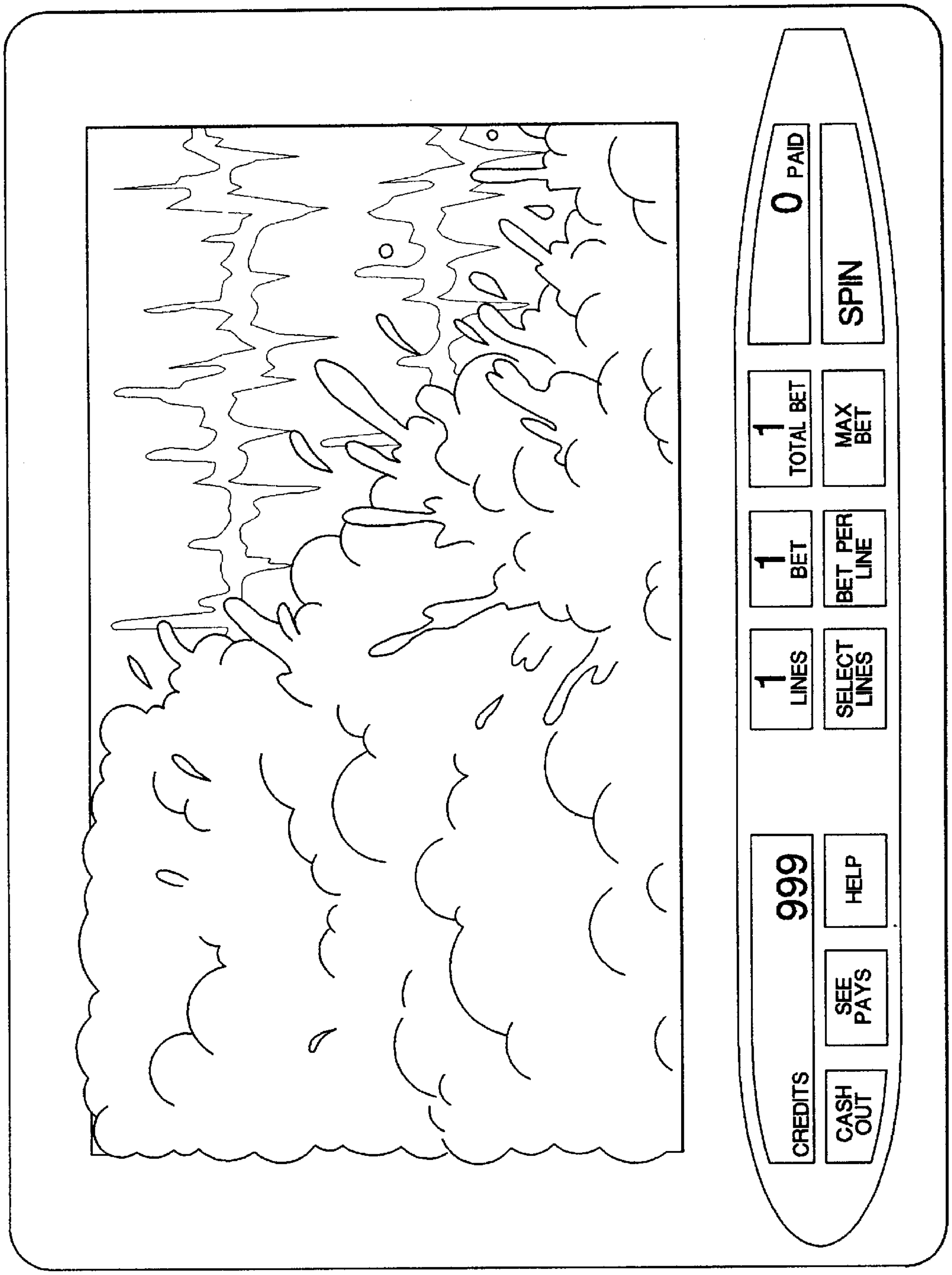

A second embodiment of display 32 provides a plurality of reels 70 (similar to reels 30, 40 and 60) which have a plurality of symbols 72 as illustrated in FIGS. 6A and 6B. In the depicted embodiment, symbols 72 includes cars, the sun, hats, surf boards, etc. Here, the gaming scheme provides a plurality of screens emulating movement and providing a screen 74. The screen 74 covers, obscures or hides reels 70 using a wave 76 that washes over the reels 70. Screen 74 obscures the reels 70 and symbols 72 while the reels 70 spin, heightening the player's anticipation of the final outcome and entertaining the player.

It should be appreciated that the present invention is preferably employed for bonus rounds in gaming machines. It should also be appreciated that the present invention may be employed in other gaming machines such as video poker, video blackjack and other card gaming machines, keno gaming machines, bingo gaming machines and lotto type gaming machines. In such gaming machines, the cards (instead of the symbols) are covered.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

What is claimed is:

1. A gaming device comprising:

a plurality of symbols on a plurality of reels;

a screen; and a game operable upon a wager by a player and controlled by a controller, said controller is operable with a video display to: (i) display a first set of symbols from the plurality of symbols by spinning the reels to a player on the video display, (ii) display a rearrangement of the plurality of symbols to create and display a second set of symbols from the plurality of symbols on the video display, (iii) initiate a display of the screen to cover at least a portion of the symbols with the screen during the display of the rearrangement of the symbols on the video display, and (iv) terminate the display of the screen during the display of the rearrangement of the symbols on the video display.

2. The gaming device of claim 1, wherein the controller includes means for randomly altering the arrangement of the symbols.

3. The gaming device of claim 1, wherein the display device includes a video monitor.

4. The gaming device of claim 1, wherein the screen covers a portion of a plurality of the symbols during the display of the rearrangement of the symbols.

5. The gaming device of claim 1, wherein the screen covers a portion of each of the symbols during the display of the rearrangement of the symbols.

6. The gaming device of claim 1, wherein the screen covers all of a plurality of the symbols during the display of the rearrangement of the symbols.

7. The gaming device of claim 1, wherein the screen covers all of the each of the symbols during the display of the rearrangement of the symbols.

8. The gaming device of claim 1, wherein the screen covers at least a portion of the symbols by beginning at one edge of the display device and moving towards another edge of the display device.

9. The gaming device of claim 1, wherein the screen forms a pattern that covers at least a portion of the symbols.

10. A gaming device comprising:

means for controlling said gaming device;

means for a video display of a first set of symbols from a plurality of symbols on a plurality of reels to a player, the displaying means connected to the controlling means;

means for re-arranging the plurality of symbols on the reels so that the displaying means displays a rearrangement of the symbols to create a video display of a second set of symbols from the plurality of symbols on the plurality of reels, the re-arranging means connected to the controlling means; and means for obscuring the symbols from the player which is initiated during the display of the rearrangement and for subsequently revealing the symbols during said display of the rearrangement.

11. The gaming device of claim 10, wherein the display means displays the first and second sets of symbols on a plurality of reels.

12. The gaming device of claim 10, wherein the display means includes a video monitor.

13. The gaming device of claim 12, wherein the video monitor includes a touch screen.

14. The gaming device of claim 10, wherein the obscuring means provides an exhibition to a player that emulates movement.

15. The gaming device of claim 10, wherein the obscuring means covers a portion of a plurality of the symbols during the display of the rearrangement of the symbols.

16. The gaming device of claim 10, wherein the obscuring means obscures a portion of each of the symbols during the display of the rearrangement of the symbols.

17. The gaming device of claim 10, wherein the obscuring means obscures all of each of the symbols during the display of the rearrangement of the symbols.

18. The gaming device of claim 10, wherein the plurality of symbols are symbols of a game selected from the group consisting of: a keno game, a bingo game and a lotto game.

19. The gaming device of claim 10, wherein the obscuring means obscures the symbols by beginning at one edge of the displaying means and moving towards another edge of the displaying means.

20. The gaming device of claim 10, wherein the obscuring means forms a pattern that obscures the symbols.

21. A method for operating a gaming device comprising the steps of:

(a) displaying a plurality of reels with symbols thereon on a video display;

(b) randomly determining a new combination of symbols;

(c) displaying the random determination of the new combination of symbols on said video display;

(d) covering and then uncovering at least one of the reels during said displaying of the random determination of the new combination of symbols on said video display; and (e) displaying said new combination of symbols.

22. The method of claim 21, which includes repeating steps (b) through (d) until the occurrence of a predetermined event.

23. The method of claim 21, wherein covering the reels includes providing an exhibition that emulates movement.

24. The method of claim 21, which includes spinning said reels to randomly determine a new combination of symbols.

25. The method of claim 24, wherein the step of covering at least one of the reels includes uncovering the reels immediately before the reels stop spinning.

26. The method of claim 21, which includes covering all of the reels.

27. The method of claim 21, which includes covering at least two of said reels.

28. The method of claim 21, wherein the plurality of reels with symbols are part of a bonus scheme of the gaming device.

29. A method for operating a gaming device comprising the steps of;

(a) displaying a plurality of cards on a video display;

(b) randomly determining a new combination of cards;

(c) displaying the random determination of the new combination of cards on said video display;

(d) initiating a covering of at least one of the cards when displaying the random determination of the new combination of cards on said video display and terminating said covering while still displaying the random determination of said new combination of cards; and (e) displaying said new combination of cards on said video display.

30. The method of claim 29, wherein the cards are used in a video poker game.

31. The method of claim 29, wherein the step of determining a new combination of cards includes determining a new number on at least one card.

32. A gaming device comprising:

a processor;

a plurality of symbols; and a video display device connected to the processor, the display device and processor operable to: (i) display a first set of symbols from the plurality of symbols to a player on the video display device, (ii) display a portion of a rearrangement of the plurality of symbols while at the same time initiating a display of a cover on at least a portion of the video display device, the rearrangement creating a second set of symbols from the plurality of symbols, (iii) terminate the display of the cover during the rearrangement of the plurality of symbols, and (iv) display the second set of symbols on the video display device.

33. The gaming device of claim 32, wherein the first and second sets of symbols include a plurality of slot machine reels.

34. The gaming device of claim 32, wherein the cover begins at one edge of the display device and moves towards another edge of the display device.

35. The gaming device of claim 32, wherein the cover forms a pattern.

36. The gaming device of claim 32, wherein the cover leaves a portion of a plurality of the symbols visible during the display of the rearrangement of the symbols.

37. The gaming device of claim 32, wherein the cover leaves a portion of each of the symbols visible during the display of the rearrangement of the symbols.

38. The gaming device of claim 32, wherein the cover leaves all of a plurality of the symbols visible during the display of the rearrangement of the symbols.

39. A gaming device comprising:

a processor;

means for a video display of a first set of symbols from a plurality of symbols to a player, the displaying means connected to the processor, and a rearrangement of the plurality of symbols to create a second set of symbols from the plurality of symbols, wherein the displaying means displays a portion of said rearrangement of the plurality of symbols while at the same time initiating and then terminating the video display of an exhibition on at least a portion of the display device, and wherein the displaying means thereafter displays the second set of symbols.

40. The gaming device of claim 39, wherein the exhibition includes a visual representation of a person, place or thing at rest or in motion.

41. The gaming device of claim 39, wherein the exhibition includes at least one of: an animation and a motion picture.

42. The gaming device of claim 39, wherein the exhibition begins at one edge of the displaying means and moves towards another edge of the displaying means.

43. The gaming device of claim 39, wherein the exhibition forms a pattern.

44. The gaming device of claim 39, wherein the exhibition leaves a portion of a plurality of the symbols visible during the display of the rearrangement of the symbols.

45. The gaming device of claim 39, wherein the exhibition leaves a portion of each of the symbols visible during the display of the rearrangement of the symbols.

46. The gaming device of claim 39, wherein the exhibition leaves all of a plurality of the symbols visible during the display of the rearrangement of the symbols.

47. A method of operating a gaming device comprising the steps of:

(a) displaying a first set of randomly determined symbols on a video display;

(b) displaying a portion of a rearrangement of the first set of symbols while at the same time initiating and then terminating a display of an exhibition on at least a portion of the said video screen; and (c) displaying a second set of randomly determined symbols on said video display.

48. The method of claim 47, wherein the steps (a) to (c) are provided via a data network.

49. The method of claim 48, wherein the data network is an internet.

50. The method of claim 47, which includes displaying the exhibition and a portion of a plurality of the symbols during the rearrangement of the first set of symbols.

51. The method of claim 47, which includes displaying the exhibition and a portion of each of the symbols during the rearrangement of the first set of symbols.

52. The method of claim 47, which includes displaying the exhibition and all of a plurality of the symbols during the rearrangement of the first set of symbols.

53. A method of operating a gaming device comprising the steps of:

(a) displaying a first set of randomly determined symbols on a video display;

(b) beginning a display of a rearrangement of the first set of symbols on said video display;

(c) covering all of the rearrangement for a period of time with a different display and then uncovering the rearrangement while the rearrangement continues;

(d) ending the display of the rearrangement; and (e) displaying a second set of randomly determined symbols on said video display.

54. The method of claim 53, wherein covering all of the rearrangement includes displaying a pattern.

55. The method of claim 53, wherein the steps (a) to (e) are provided via a data network.

56. The method of claim 55, wherein the data network is an internet.

57. A method of operating a gaming device comprising the steps of:

(a) displaying a first set of randomly determined symbols on a video display;

(b) beginning a display of a rearrangement of the first set of symbols;

(c) covering at least a portion of the rearrangement with the pattern for a period of time with a different display and then uncovering the covered portion while the rearrangement continues; and (d) displaying a second set of randomly determined symbols on said video display.

58. The method of claim 57, wherein the steps (a) to (d) are provided via a data network.

59. The method of claim 57, wherein the data network is an internet.

60. The method of claim 57, which includes covering at least a portion of a plurality of the symbols during the rearrangement of the first set of symbols.

61. The method of claim 57, which includes covering at least a portion of each of the symbols during the rearrangement of the first set of symbols.

62. The method of claim 57, which includes covering all of a plurality of the symbols during the rearrangement of the first set of symbols.

63. A gaming device comprising:

a plurality of symbols;

a plurality of gaming reels displayed to a player with said plurality of symbols thereon;

means for covering said plurality of gaming reels;

a processor operable with said plurality of gaming reels and said covering means, and upon the player making a wager, to cause the plurality of gaming reels to spin, to cause the covering means to cover a plurality of said gaming reels for a period of time and uncover said plurality of gaming reels while the plurality of gaming reels are still spinning, and to cause the plurality of gaming reels to stop spinning and display a set of the symbols to the player.

* * * * *